Jan. 22, 1963

J. H. REAVES 3,075,155

DIFFERENTIAL AMPLIFIER

Filed Sept. 28, 1959

2 Sheets-Sheet 1

INVENTOR.

JOHN H. REAVES

BY

Hurvitz & Rose

ATTORNEY

INVENTOR.
JOHN H. REAVES
BY Hurwitz & Rose
ATTORNEY 3,075,155
Patented Jan. 22, 1963

3,075,155
DIFFERENTIAL AMPLIFIER

John H. Reaves, McLean, Va., assignor to Elcor, Inc., Falls Church, Va., a corporation of Virginia Filed Sept. 28, 1959, Ser. No. 842,935
11 Claims. (Cl. 330—69)

The present invention relates to amplifier circuits and more particularly to a differential amplifier employing a special type of power supply as described in co-pending patent application Serial No. 683,740 of John F. Walton and John H. Reaves filed on September 13, 1957, for Isolated Power Supply and assigned to the same assignee as the present invention, now Patent No. 2,914,719.

In the aforesaid co-pending patent application, there is described a power supply for tubes or transistors which may be connected between the plate of the tube or the collector of the transistor and the anode or collector load resistor. The end of the load resistor remote from the power supply is grounded and therefore the power supply floats with respect to ground. In such a system the ungrounded end of the resistor in a tube system and in a PNP transistor system is at negative potential with respect to ground and by appropriately choosing the value of the resistor, the quiescent or no-signal D.C. voltage developed across this resistor may be maintained at the negative bias required for the next succeeding stage of amplification and direct coupling between the load resistor of one stage and the grid of the tube of the succeeding stage may be employed. The advantages of such a system are obvious in that the frequency response of the system is not limited by coupling capacitors or the system is not complicated or subject to drift in consequence of the utilization of voltage dividers normally employed in direct coupled amplifiers. The reason that conventional power supplies have not been employed in such circuits is that the capacity to ground of the conventional power supply is so large that the time constant of the circuit including the load resistor and the capacity of the power supply is considerable and severely restricts the frequency response of the amplifier. In the aforesaid co-pending application, there is described an anode power supply having a shunt capacity to ground of the order of magnitude of 15 micro-microfarads. Because of the extremely low capacity to ground of this supply, it may be readily employed in amplifier circuits between the anode of a tube and the load resistor while permitting the circuit to be employed to amplify signals up to several megacycles per second. Although the frequency response of the basic circuit is limited to frequencies of several megacycles per second, in the co-pending application of Reaves and Walton, Serial No. 777,037 filed November 28, 1958, now Patent No. 3,046,-489, for Wide Band Direct Coupled Amplifiers and assigned to the same assignee as the present invention, there are described circuit arrangements which extend the frequency band over which the circuits of this type may operate from D.C. to frequencies of the order of magnitude of 40 to 50 megacycles per second.

A disadvantage of the types of circuits described above is that each tube requires an individual power supply and each of these power supplies is relatively expensive. Although in many instances the aforesaid power supplies are competitive with the highly regulated and specialized power supplies required by conventional circuitry, in other cases, it is found that the aforesaid supplies may be more expensive due to the requirement for a large number of them.

In accordance with the present invention there is provided at least a two stage amplifier in which only the first stage requires the aforesaid specialized power supplies and the second stage may employ a conventional power supply but at the same time derive all of the advantages normally achieved with the specialized power supplies and the circuits wherein the supply is connected between the plate and the load resistor. Specifically, the first stage of the amplifier employs a differential amplifier circuit in which each tube has a separate special power supply connected between the anode and its load resistor. The cathodes of the tubes of the differential amplifier are returned to a large negative potential and large load resistors are employed so that the quiescent voltages developed across the load resistors, when no input signals are applied to the system, have a large negative value and therefore, the junction of the power supplies and the load resistors are at a large negative potential with respect to ground. In consequence, the cathodes of the tubes of the next succeeding stage of the differential amplifier are maintained at quite a large negative voltage with respect to ground and the anodes may be operated at near ground potential. Actually, the anodes are returned to ground directly through their load resistors and the power supply for this stage is connected between the cathode and ground. In consequence, the anodes of the second stage are negative with respect to ground by an amount which may be accepted directly by a next succeeding stage of amplification and all of the desired results normally obtained with the specialized circuits employed in the first stage are obtained in the second stage without requiring the specialized power supplies. It is apparent that, with the anodes of the second stage tubes returned directly to ground through their load resistors and with the anodes at a negative potential with respect to ground which may be accepted by a succeeding stage of amplification, no blocking capacitors or voltage divider networks are required and direct coupling may be effected between the second stage of the amplifier and a succeeding stage. Thus, the circuit requires only three power supplies and only two of these are of a specialized type and yet all four tubes operate with the advantages normally attributed only to circuits employing the aforesaid specialized power supplies.

The difficulty with the first embodiment of the invention is that the large resistors increase the time constants of the circuits to a point where the upper limit of frequency response is materially reduced below that normally attributed to circuits of this type. In a second embodiment of the invention, this difficulty is overcome by returning the load resistors to the negative potential to which the cathodes are returned. In consequence, the voltage supply for maintaining the cathodes negative is no longer connected in series between the cathodes and anodes and need now be only a bias supply which does not supply any current whatsoever to the circuit. Since the load resistors are now returned to a large negative potential, the values of the resistors may be quite small and the time constant of the output circuit materially reduced to provide a circuit having the normal frequency response of circuits of this type. The second stage of the amplifier is not affected in any way by this change in the first stage.

In a third embodiment of the present invention, a feedback voltage may be applied directly from one of the anodes of the second stage of the amplifier to one of the grids of the first stage of the differential amplifier merely by tapping one of the load resistors in this second stage. A small bias supply is connected in series with the feedback circuit so that the grid of the first statge tube is at ground potential in the absence of an input signal. According to a still further embodiment of the present invention, when it is desired to maintain the anodes of the output stage at ground potential rather than at a negative potential when no signal is applied to the circuit, a small bias supply may be connected between the anode load resistors and ground. This supply must furnish only a relatively small amount of power to the system and therefore may have a small current capacity; however, its internal impedance should be maintained at a minimum. Since the anodes are at ground potential in the absence of an output signal, the D.C. level of the anodes is proper for the feedback signal but the signal voltage at the anode of the second stage is much larger than the signal at the input to the first stage. Therefore, if a direct connection between the anode of a second stage tube and the grid of a first stage tube were employed, the gain of the circuit would be destroyed. In this embodiment of the invention, a bleeder resistor is connected between the anode of one of the output stages and ground. Since the anode is at ground potential in the absence of an input signal and the resistor is returned to ground potential, there is no D.C. voltage across this resistor and only signal voltage appears thereacross. Any point along the resistor may be tapped to provide the feedback voltage, depending upon the magnitude of the voltage desired.

The circuits of the present invention may employ tubes or transistors and the tubes may be triodes although pentodes are preferred so as to render the system relatively insensitive to supply voltage variations. In addition, the circuits may employ the high frequency compensation schemes set forth in the second aforementioned co-pending application of Reaves and Walton in order to raise the frequency response of the circuit to an order of magnitude of 50 megacycles per second.

It is an object of the present invention to provide an amplifier which may employ direct coupling between successive stages without requiring voltage divider networks.

It is another object of the present invention to provide an amplifier employing two cascaded stages in which the second stage of the amplifier may be operated with the anodes returned directly to ground through their load impedances.

It is still another object of the present invention to provide a cascaded differential amplifier in which the bias potential of the output voltages of the first stage are of such a value as to permit the tubes or the amplifying elements of the second stage to have their anodes or collectors returned directly to ground through their load impedances.

It is yet another object of the present invention to provide a differential voltage amplifier having a frequency response to form D.C. to several megacycles per second in an uncompensated version and D.C. to approximately 50 megacycles per second in a compensated version in which only two special power supplies are required for the four tubes required in the circuit.

The above and still further objects, features and advantages of the present invention will become apparent upon consideration of the following detailed description of several embodiments thereof, especially when taken in conjunction with the accompanying drawings, wherein.

Figure 1:
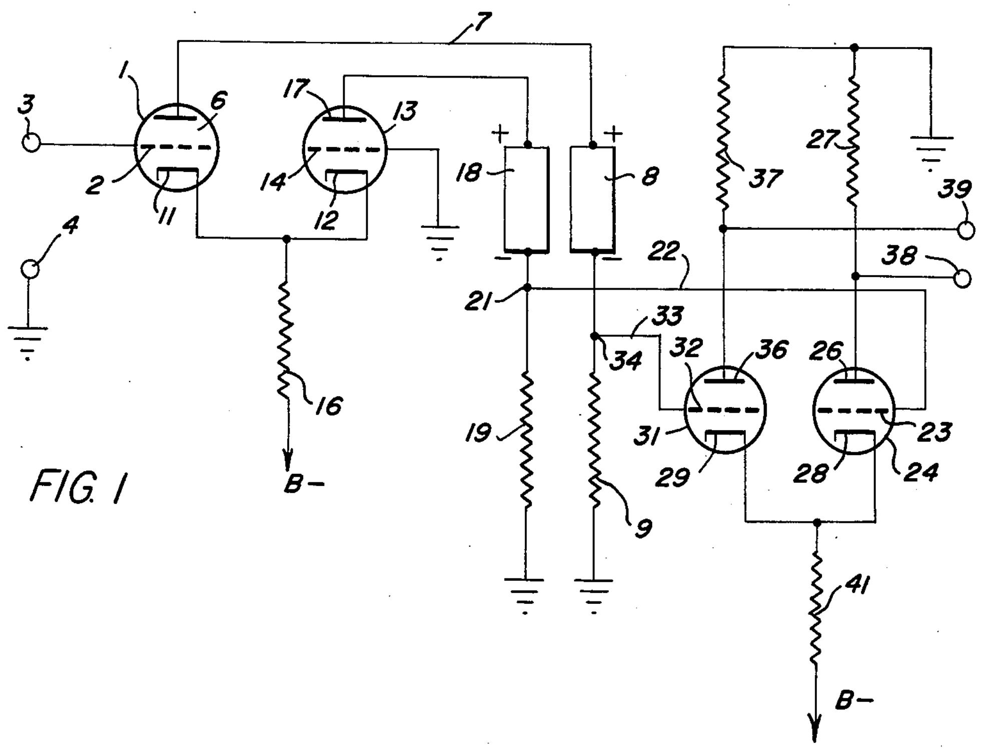
FIGURE 1 is a schematic wiring diagram of one form of the circuit of the present invention.

Referring specifically to FIGURE 1 of the accompanying drawings, there is illustrated one form of the circuit of the present invention. A triode 1 has a control grid 2 connected to one input terminal 3 of the system and a second input terminal 4 is connected to a source of reference potential which is illustrated, for the purposes of explanation, as ground. The tube 1 further comprises an anode 6 connected via a lead 7 to a positive terminal of an isloated power supply 8 of the type described in the aforesaid co-pending application Serial No. 683,740, now Patent No. 2,914,719. A negative terminal of the supply 8 is connected through a large load resistor 9 to ground potential. The tube 1 also includes a cathode 11 connected to a cathode 12 of a second triode 13 having a control grid 14 connected to ground. The cathodes 11 and 12 are connected via a resistor 16 to a negative source of potential, the positive terminal of which is grounded. The tube 13 also includes an anode 17 connected to a positive terminal of a second isolated power supply 18, the negative terminal of which is connected via a large load resistor 19 to ground.

A junction 21 between the supply 18 and load resistor 19 is connected via lead 22 to a grid 23 of a further triode 24 having an anode 26 connected via a load resistor 27 to ground. The tube 24 further comprises a cathode 28 connected to a cathode 29 of a triode 31 having a grid 32 connected via a lead 33 to a junction 34 between the supply 8 and load resistor 9. The tube 31 has an anode 36 connected via a load resistor 37 to ground potential and the anodes 26 and 36 of the tubes 24 and 31 respectively are connected to output terminals 38 and 39 across which is developed a push-pull output voltage having a negative bias with respect to ground. To complete the circuit, the cathodes 28 and 29 are connected via a cathode resistor 41 to the negative source B— which may be the same source to which the cathodes 11 and 12 are connected via the resistor 16.

In operation of the circuit, a signal is applied to the grid 2 of the triode 1 and a signal of reverse polarity is developed at the junction 34 of this circuit. Concurrently therewith, the voltage on the cathodes 11 and 12 varies in phase with the signal applied to the grid 2 and since the grid 14 is connected to ground, the conduction through the tube 13 varies in an opposite phase to conduction through the tube 1 and the junction 21 in this tube circuit deviates from its D.C. potential equally but in opposite direction to the deviation of the junction 34. Therefore, the voltages at the junctions 21 and 34 which are applied to the grids 23 and 32 of tubes 24 and 31 respectively, constitute the push-pull output signals of the differential amplifier including tubes 1 and 13 and their associated circuits.

In the operation of the circuits, since each power supply is connected between the anode and the anode load resistor and the end of the anode load resistor remote from the power supply is grounded, the negative terminal of the power supply is negative with respect to ground whenever the associated tube draws current. This is readily apparent when one considers the current flowing through a tube as flowing from the anode to the cathode, then the current flowing in the circuit of the tube 13 flows from ground through the resistor 19, the supply 18 and the tube 113 and in consequence the end of the resistor 19 remote from ground must be negative with respect to this latter potential. If the resistors 9 and 19 are high impedance elements, the quiescent negative voltage on the leads 22 and 33 is quite large with respect to ground. In consequence, the cathodes 28 and 29 of the tubes 24 and 31 respectively, must be maintained also at a large negative voltage with respect to ground and by properly choosing the elements of the circuit, the cathodes 28 and 29 are at such a large potential with respect to ground that the anodes 26 and 36 associated with these cathodes respectively, may be coupled through their load resistors 27 and 37 directly to ground. It will be noted then that advantage is taken of the fact that the connection of the power supply between an anode and its load permits the negative terminal of the supply to be maintained at a large negative voltage with respect to ground and in consequence the succeeding stage may have its anode operated at ground potential.

The advantage of the circuit illustrated in FIGURE 1 is that all of the advantages incident to the deposition of a power supply between the anode and the resistor are obtained in the second stage without having to employ the individual supplies for the tubes. Specifically, the anodes 26 and 36 have a quiescent negative potential with respect to ground that permits them to be connected directly to the grid of a succeeding power amplifier stage without requiring coupling capacitors or divider networks. For example, if the B— supplies are 105 volts, and —80 volts is developed at the grids 23 and 32, then the anodes 26 and 36 may be operated at approximately —20 volts with respect to ground. Also by appropriately choosing the B— values and the values of the resistors 27, 37, 9 and 19 and the properties of the various tubes, the quiescent voltage appearing across the leads 38 and 39 may be made sufficiently negative that a second stage of the type employing the tubes 24 and 31 may be employed to produce further voltage amplification before application of the signals to a power amplifier stage.

The primary feature of the circuit illustrated in FIGURE 1 is that only three power supplies are required for four tubes even though all four tubes operate with the same advantages achieved when individual power supplies of the type described in the aforesaid co-pending application are employed with each tube. Also, only two of the three supplies required by the circuit of FIGURE 1 are of special construction while the B— power supply may be of completely conventional construction, thereby avoiding the expense of an additional supply of the special type.

It will be noted that the cathode resistor is returned to a large negative potential while the input circuit has one terminal ground. The cathode of the input tube 1 therefore must be near ground potential and the cathode resistor 16 must be quite large ordinarily, the degeneration introduced by such a large cathode resistor would materially restrict the gain of the circuit but in a differential amplifier there is only a small change in current through the common cathode resistor and a relatively small amount of degeneration occurs.

A difficulty with the circuit of FIGURE 1 is that its high frequency response is limited due to the large time constant of the load circuits of the tubes 1 and 13. In order to provide a sufficiently large negative voltage on the leads 22 and 33, the resistors 9, 19 must be quite large. As previously indicated, the supplies 8 and 18 have a relatively low shunt capacity with respect to ground; namely, of the order or magnitude of 15 micro-microfarads but when combined with resistors of the values required in the circuit of FIGURE 1 for the load resistors 9 and 19, the time constants of the circuit begin to become relatively large and limit the upper frequency response of this circuit.

Figure 2:
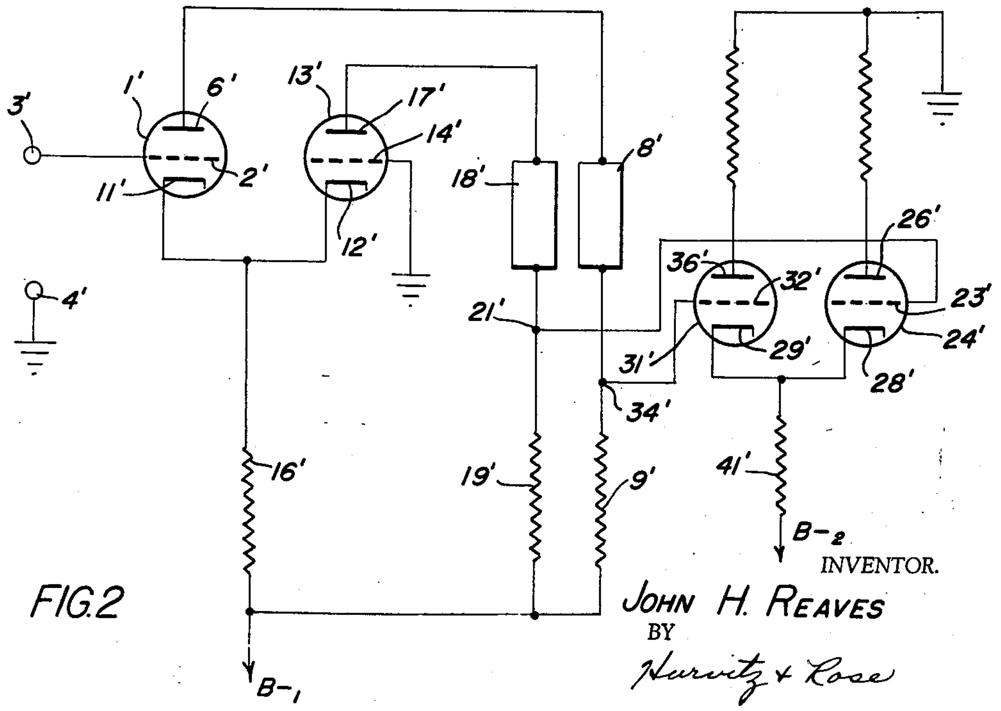
FIGURE 2 is a schematic wiring diagram of a second embodiment of the present invention.

Referring now specifically to FIGURE 2 of the accompanying drawings, there is illustrated a circuit in which the high frequency response is not limited by the requirement of large values of load resistors for the tubes 1 and 13. In the circuit of FIGURE 2, all of the elements are identical with those illustrated in FIGURE 1 and carry the same reference numerals. However, in order to prevent confusion, primes are applied to the numbers employed in FIGURE 2. In this figure, the ends of the resistors 9′ and 19′ remote from the supplies 8′ and 18′ rather than being returned to ground are returned to a $B_1$— supply. In consequence, the lower ends of these resistors have a large negative potential with respect to ground and the values of the resistors need only be relatively small to provide, at the junctions 21′ and 34′ a voltage sufficient to drive the grids 23′ and 32′ of the tubes 24′ and 31′ respectively. In fact, in the circuit of FIGURE 2, the voltages at the junctions 21′ and 34′ may be made more negative than the voltages appearing at corresponding junctions in FIGURE 1 and the voltage $B_2$— to which the resistor 41′ is returned is more negative than in FIGURE 1. However, it will be noted that in this embodiment of the present invention, the $B_1$— voltage to which the cathodes 11′ and 12′ are returned does not carry any of the anode voltage of the tubes 1′ and 13′ and serves only as a bias source. Therefore, the voltage applied to the lower end of the resistors 9′, 16′ and 19′ may be developed from a voltage divider in the $B_2$— supply without affecting the $B_2$— voltage of the negative power supply circuit. Thus, the circuit of FIGURE 2 has all of the advantages of the circuit of FIGURE 1 and, in addition, the high frequency response of the circuit is not limited due to the utilization of large values of load resistors for the tubes 1 and 13.

Figure 3:
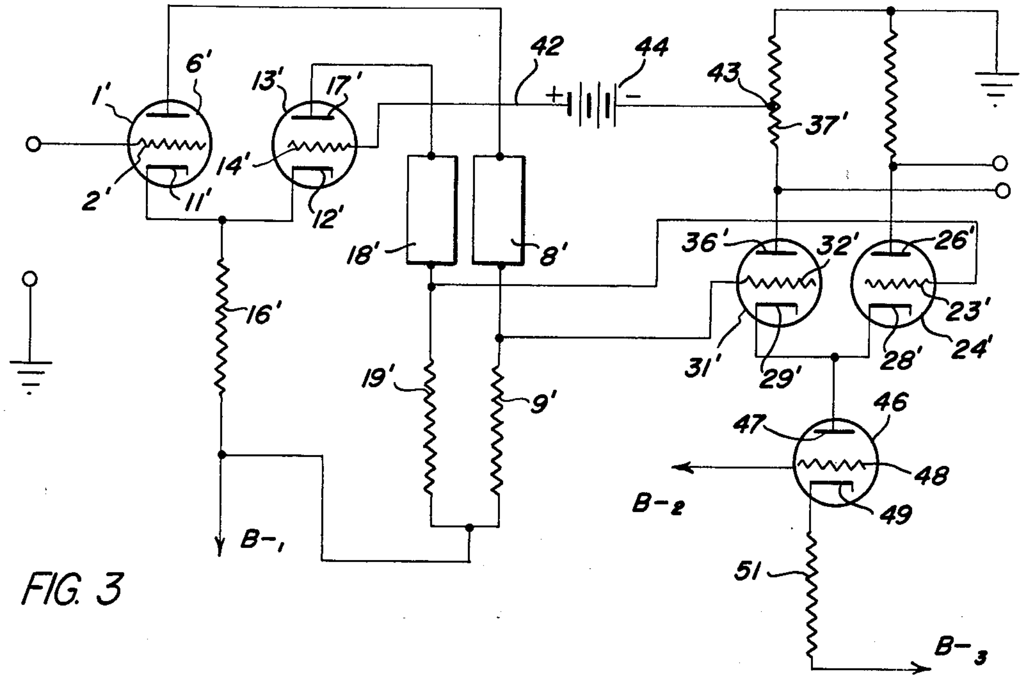
FIGURE 3 is a schematic wiring diagram of a third embodiment of the present invention.

Referring now to FIGURE 3 of the accompanying drawings, there is illustrated a further embodiment of the present invention and again those elements which are common to FIGURES 1 and 3 bear the same reference numerals except that in FIGURE 3 the numerals are double primed. Specifically, in the circuit of FIGURE 3, the grid 14″ of the tube 13″ is not connected to ground but is connected via a lead 42 to a tap 43 on the anode load resistor 37″ of the tube 31″. This circuit then provides negative feedback without requiring a coupling capacitor to eliminate high values of D.C. from the grid 14″. However, a small positive bias cell 44 may be inserted in the lead 42 so as to develop a zero potential on the grid 14″ since all points along the resistor 37″ are negative with respect to ground. The tap 43 is connected to a point on the resistor 37″ having a relatively small quiescent potential with respect to ground; such as, four volts and therefore source 44 need only be a four volt source or in other circuit arrangements may have an even lower voltage.

Another variation in the circuit of FIGURE 3 is the utilization of a triode 46 as the load for the cathodes 29″ and 28″ of the tubes 24″ and 31″ respectively. The tube 46 has an anode 47 connected to the cathodes 28″ and 29″, a control grid 48 returned to a fixed reference potential with respect to the negative source $B_2$— and a cathode 49 returned through a cathode resistor 51 to a source of negative anode potential B—.

The circuit of the type comprising the tubes 24 and 31 of FIGURE 1 and the corresponding circuit of FIGURE 2, is quite sensitive to supply voltage changes when the tubes are other than at their quiescent operating point. When a signal is applied to the tubes 24 and 31, since the excursions of the signals from zero are of opposite polarities, the tubes are operating at different points on their characteristic curves so that a change in voltage across the tubes has a different effect upon each of the tubes. In order to overcome this effect, a constant voltage source may be employed. However, such a source is expensive and, in acordance with the present invention, the tube 46 is employed as a constant curernt device in place of the constant voltage source. Since the control grid 48 of the tube 46 is returned to a reference voltage that is fixed with respect to the $B_2$— supply voltage, the current through this tube remains essentially constant even though the $B_2$— voltage may vary. The same current is therefore applied at all times to the junction of the cathodes 28″ and 29″ of the tubes 24″ and 31″. The division of current between the two tubes is only a function of the input signal and therefore, the ratio of the voltages at the anodes of the tubes 24″ and 31″ is a function of the applied input voltages and not of the power supply voltage.

Figure 4:
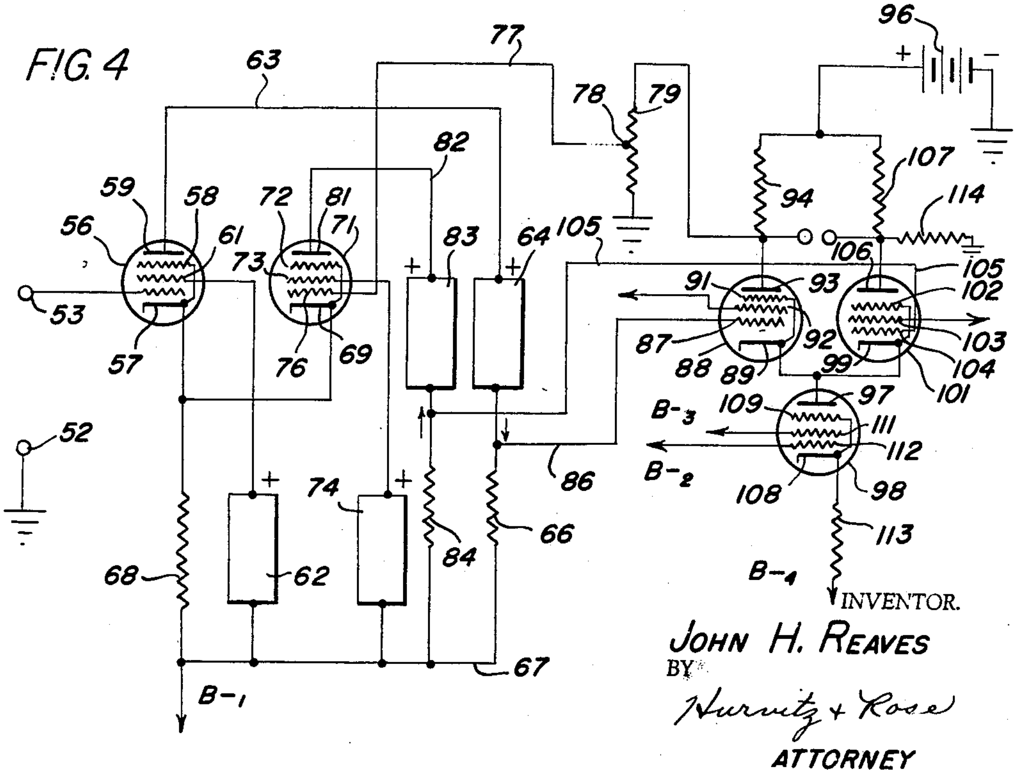
FIGURE 4 is a schematic wiring diagram of a fourth embodiment of the present invention.

In the circuit of FIGURES 1–3 triodes are employed for tubes 1 and 13, as a result, the system is affected somewhat by changes in the voltage of the special power supplies 8 and 18. Thus disadvantage is overcome by the use of pentodes for tubes 1 and 13. Since pentodes are relatively insensitive to plate voltage variations, the currents will be essentially unaffected by changes in the voltage of the supplies 8 and 18, and will vary only with signal voltage changes. FIGURE 4, which shows this improvement, also discloses a means for operating the anodes of the two tubes of the output stage at ground potential and a novel feedback circuit operating from one of the tubes.

Referring now specifically to FIGURE 4 of the accompanying drawings, input signals are applied between a grounded input terminal 52 and a second input terminal 53. The terminal 53 is connected to a control grid 54 of a tube 56 having a cathode 57, an anode 59 and a screen grid 61 which is biased to operating potential by a bias supply 62. The anode 59 of the tube 56 is connected via a lead 63 to the positive terminal of an isolated power supply 64, the negative terminal of which is connected via a load resistor 66 to a negative bias voltage lead 67; the lead 67 being returned to a source of negative voltage. The cathode 57 of the tube 56 is connected through a cathode resistor 68 to the lead 67 and also to a cathode 69 of a second tube 71 of the differential amplifier. The tube 71 further comprises a suppressor grid 72 connected to the cathode 69. A screen grid 73 biased to operating potential by a suitable bias supply 74 which may be the same supply as supply 62 and a control grid 76 which is connected via a lead 77 to a tap 78 on the resistor 79. The tube 71 further comprises an anode 81 connected via a lead 82 to the positive terminal of an isolated anode supply 83, the negative terminal of which is connected through a load resistor 84 to the terminal 67.

This completes the differential input amplifier which operates substantially the same as the differential input amplifier of FIGURE 3 with feedback voltage being applied to the grid 76 via the led 77. The voltage developed across the load resistor 66 is applied via a lead 86 to a control grid 87 of a pentode 88 having a cathode 89, a suppressor grid 91 connected to the cathode 89, a screen grid 92 connected to a suitable reference potential (which is normally ground) and an anode 93. The anode 93 is connected via a load resistor 94 to a positive terminal of an anode bias supply 96, the negative terminal of which is grounded. The cathode 89 of the tube 88 is connected to an anode 97 of a further pentode 98 and to a cathode 99 of a still further pentode 101. The pentode 101 has a suppressor grid 102 connected to the cathode 99, a screen grid 103 connected to a suitable source of screen grid potential (normally ground), and a control grid 104 connected via a lead 105 to the junction of the power supply 83 and load resistor 84 of the tube 71. The tube 101 further comprises an anode 106 connected via a load resistor 107 to the positive terminal of the bias source 96. The tube 98 comprises a cathode 108, a suppressor grid 109 connected thereto, a screen grid 111 connected to a suitable source of screen potential and a control grid 112 also connected to a fixed bias potential. Both the screen potential and the fixed bias potentials are constant with respect to the $B_4$— voltage supply. The cathode 108 is returned through a cathode resistor 113 to a negative anode source.

The operation of the circuit of FIGURE 4 is substantially the same as that of FIGURE 3 except for the utilization of pentodes to render the circuit insensitive to supply voltage variations and the utilization of an anode bias source 96. The source 96 is employed merely to raise the quiescent voltages on the anodes 93 and 106 of the pentodes 88 and 101 respectively to ground potential for operation in circuits where it is necessary to have the grid of the stage being driven by the tubes 88 and 101 at ground potential. The source 96 supplies only a relatively small amount of the total anode power since its voltage is low, and therefore it may be small. Since the control grid 76 of the pentode 71 in the first stage of differential amplifier should be biased to ground potential, the anode 93 of the tube 88 is at the proper bias for the tube 71 but the signal developed at the anode 93 is, of course, far too large to be fed back to the input stage since it would completely destroy the gain of the system. In order to provide the requisite feedback signal, the resistor 79 is connected between the anode 93 and ground. Since the anode 93 is at ground potential during intervals of no signal input, there is no flow of current through this resistor and therefore, the feedback tap 78 can be made anywhere along this resistor without introducing any bias into the circuit of tube 71. Balance of the system may be preserved by connecting a resistor 114 between the anode 106 of the tube 101 and ground. However, when signal potentials are applied to the circuit and an operating voltage is developed on the anode 93, this voltage is also developed across the resistor 79 and any predetermined portion thereof may be tapped off by the tap 78 which is connected via lead 77 to the grid 76 of the tube 71. Therefore, the feedback arrangement in this system does not affect either operating bias of the tube 71 or the quiescent conditions existing in the circuit comprising tubes 89 and 101 but does supply the requisite small amount of feedback signal at the proper bias potential for the system.

The circuits illustrated in the accompanying drawings are limited to the utilization of vacuum tubes. However, it is to be understood that the transistors may also be employed in place of the vacuum tubes particularly in the circuits of FIGURES 1–3 which employ triodes.

The circuits thus far described have all related to differential amplifiers but single ended operation may be employed. As previously indicated, a resistor of an impedance sufficient to raise the cathode to near ground potential cannot be connected in series with the cathode of the input tube since cathode degeneration would severely limit the gain of the tube. Instead, the cathode is grounded and a negative supply is connected in series with the anode circuit.

It is again wished to point out that the high frequency compensation circuits disclosed and claimed in co-pending patent application No. 777,037 may be incorporated in the circuits of the present invention, specifically, in the input stages of the system.

While I have described and illustrated several embodiments of my invention, it will be clear that variations of the details of construction which are specifically illustrated and described may be resorted to without departing from the true spirit and scope of the invention as defined in the appended claims.

What I claim is:

1. An amplifier comprising first, second, third and fourth amplifying devices each comprising a control electrode, a common electrode and an output electrode, first, second, third and fourth load impedances for said first, second, third and fourth amplifying devices respectively; a pair of sources of load current, means connecting a different one of said sources between said first and said second amplifying devices and their associated load impedances, a common electrode impedance, means connecting said common electrodes of said first and second amplifying devices through said common electrode impedance to a negative terminal of a source of potential having a positive terminal connected to a point of reference potential, means connecting an end of said first and second load impedances remote from said load current source to one end of said source of potential, said control electrodes of said third and fourth amplifying devices being connected to said first and second load impedances, respectively, means for biasing said common electrodes of said third and fourth amplifying devices at an operating potential with respect to their associated control electrodes and means for connecting said output electrodes of said third and fourth amplifying devices through at least their associated load impedances to the point of reference potential, said source of potential providing a voltage of sufficient magnitude to render said third and fourth amplifying devices conductive, and means for coupling an input signal to said control electrodes of said first and second amplifying devices.

2. The combination according to claim 1 wherein the end of each of said third and fourth load impedances remote from said output electrodes are connected directly to the point of reference potential.

3. The combination according to claim 2 further comprising means for connecting said control electrode of one of said first and second amplifying devices to a point on one of said third and fourth impedances and means for biasing said last mentioned control electrode to the reference potential.

4. The combination according to claim 1 further comprising a further source of potential connected between said third and fourth load impedances and the point of reference potential, said further source of potential being of such a value that the quiescent operating voltage on said output electrodes of said third and fourth amplifying devices is at the reference potential.

5. The combination according to claim 4 further comprising a negative feedback circuit including a further impedance connected between one of said output electrodes of said third and fourth amplifying devices and said reference potential and means for connecting said control electrode of one of said first and second amplifying devices to a point on said further impedance.

6. The combination according to claim 1 further comprising a constant current device connected in series with said third and fourth amplifying devices.

7. An amplifier comprising a first amplifying element having a control electrode, a common electrode and an output electrode, means for applying an input signal to said control electrode, a first load impedance, an output electrode voltage source, said voltage source being connected between said output electrode and said first load impedance and having a potential thereacross such as to render said first amplifying element conductive, a negative voltage source having positive and negative voltage terminals, means connecting a positive terminal of said negative voltage source to a point of reference potential, means connecting said common electrode to a negative terminal of said negative voltage source and means connecting an end of said first load impedance remote from said output electrode voltage source, a second amplifying element having a control electrode, a common electrode and an output electrode, a second load impedance connected between said output electrode of said second amplifying element and the point of reference potential, said control electrode of said second amplifying element being connected to said first load impedance, means connecting said common electrode of said second amplifying element to a negative voltage terminal of said negative voltage source, the potential between said last-mentioned terminal of said negative voltage source and the point of reference potential being such as to render said second amplifying element conductive and means for deriving an output signal from the output electrode of said second amplifying element.

8. The combination according to claim 7 wherein said first load impedance is connected to the point of reference potential.

9. The combination according to claim 7 wherein said first load impedance is connected to a negative terminal of said negative voltage source.

10. An amplifier comprising a first amplifying element having a control electrode, a common electrode and an output electrode, means for applying an input signal to said control electrode, the input signal having an average value which is considerably negative relative to a point of reference potential, a first load impedance, an output electrode voltage source, said voltage source being connected between said output electrode and said first load impedance and having a potential thereacross such as to render said first amplifying element conductive, a negative voltage source having positive and negative voltage terminals, means connecting a positive terminal of said negative voltage source to the point of reference potential, means connecting said common electrode to a negative terminal of said negative voltage source, and means connecting an end of said first load impedance remote from said output electrode voltage source to one of said terminals of said negative voltage source, said negative voltage source having a potential such as to render said common electrode positive relative to the average potential of said control electrode, a second amplifying element having a control electrode, a common electrode and an output electrode, a second load impedance connected between said output electrode of said second amplifying element and the point of reference potential, said control electrode of said second amplifying element being connected to said first load impedance, means connecting said common electrode of said second amplifying element to a negative voltage terminal of said negative voltage source, the potential between said last mentioned terminal of said negative voltage source and the point of reference potential being such as to render said second amplifying element conductive and means for deriving an output signal from the output electrode of said second amplifying element.

11. An amplifier comprising first, second, third and fourth amplifying devices each comprising a control electrode, a common electrode and an output electrode, first, second, third and fourth load impedances for said first, second, third and fourth amplifying devices respectively, a pair of sources of load current, means connecting a different one of said sources between said first and said second amplifying devices and their associated load impedances, a common electrode impedance, means connecting said common electrodes of said first and second amplifying devices through said common electrode impedance to a negative terminal of a source of potential having a positive terminal connected to a point of reference potential and at least one negative terminal, means connecting an end of said first and second load impedances remote from said load current sources to one of said terminals of said source of potential, said control electrodes of said third and fourth amplifying devices being connected to said first and second load impedances respectively, means connecting said common electrodes of said third and fourth amplifying devices to a negative terminal of said source of potential, and means for connecting said output electrodes of said third and fourth amplifying devices through at least their associated load impedances to the point of reference potential, said negative voltage source providing a voltage of sufficient magnitude across said third and fourth amplifying devices to render said third and fourth amplifying device conductive, said input signal having an average value which is considerably negative with respect to the reference potential, said source of potential being sufficiently negative with respect to the reference potential to provide an operating bias between said control electrodes and said common electrodes of said first and second amplifying devices.

References Cited in the file of this patent

UNITED STATES PATENTS

| | | |
|---|---|---|
| 1,516,518 | Carson | Nov. 25, 1924 |
| 1,806,657 | Wintringham | May 26, 1931 |
| 2,258,607 | Grabau | Oct. 14, 1941 |

FOREIGN PATENTS

| | | |
|---|---|---|
| 327,623 | Germany | Oct. 14, 1920 |